UNITED STATES PATENT OFFICE.

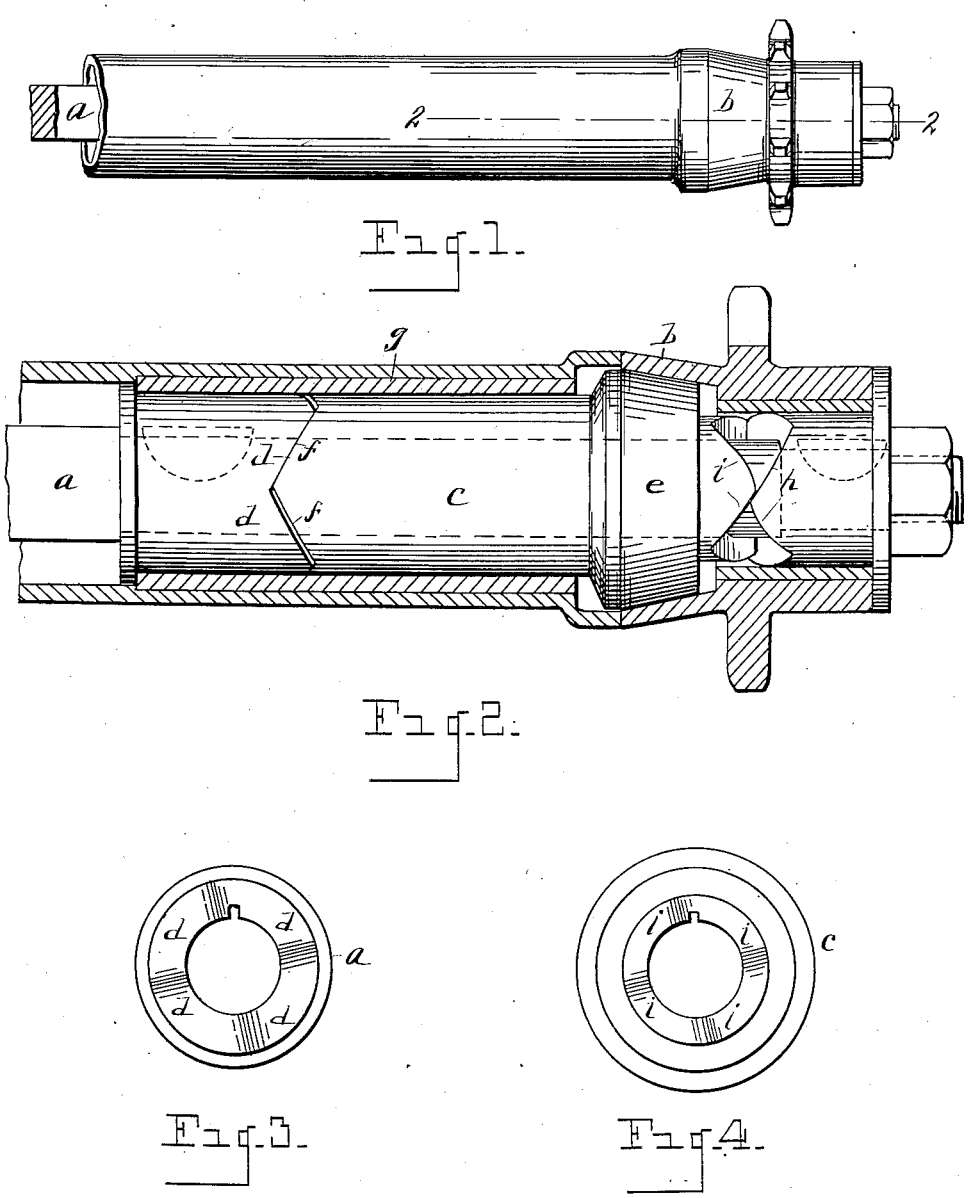

ALANSON P. BRUSH, OF DETROIT, MICHIGAN.

DOUBLE-ACTING FRICTION RATCHET MECHANISM.

No. 910,456.

Specification of Letters Patent.

Patented Jan. 19, 1909.

Application filed September 18, 1906. Serial No. 335,123.

*To all whom it may concern:*

Be it known that I, ALANSON P. BRUSH, a citizen of the United States, residing at Detroit, county of Wayne, State of Michigan, have invented a certain new and useful Improvement in Double-Acting Friction Ratchet Mechanism, of which the following is a specification, reference being had to the accompanying drawings, which form a part of this specification.

My invention has for its object to provide a double acting friction ratchet mechanism to be used where ever it is desirable to drive in both directions and still allow the driven member to overrun in the direction in which it is being driven, that is allow the driven member to run as much faster than the speed of the driving shaft as the occasion will demand, the driven mechanism being allowed to run faster than the driving mechanism in the direction in which the driving member is running, the driven mechanism being prevented from running in the opposite or reverse direction, and from running with any less velocity than the driving shaft.

My invention consists of the construction, combination and arrangement of devices hereinafter described and claimed and illustrated in the accompanying drawings, in which, Figure 1 is a view in side elevation showing parts broken away. Fig. 2 is a view in longitudinal section showing parts in elevation. Fig. 3 is an end view of the driving shaft showing the cams $d$. Fig. 4 is an end view of the friction member $c$ showing the cams $i$.

My improved mechanism is especially adapted for use in automobiles, for example, but I do not limit myself to any use to which it may be applied.

My invention consists of a driving shaft $a$, a driven member $b$ journaled upon the driving shaft, and a friction member $c$. The driving shaft is provided with driving cams indicated at $d$, the friction member $c$ being provided with a frictional surface indicated at $e$ to contact with the driven member $b$. The friction member is also provided with cams indicated at $f$ corresponding to the cams $d$. The driving cams are preferably made separate from the driving shaft, and may be made of hardened steel to increase their durability and efficiency. The driving cams and the friction member are shown mounted in a bearing $g$. It will be apparent that the cams upon the driving shaft force the friction member against the frictional surface of the driven member when the driving member rotates in either direction.

The frictional ratchet mechanism of the type described comprises a driving member, a driven member, and friction member in which the frictional tension for driving in both directions forces the driven member in the same direction longitudinally. The driving shaft is also provided with releasing cams $h$ to contact with releasing cams $i$ upon the friction member to force the friction member out of engagement with the driven member when the direction of rotation of the driving member is reversed or when the driven member overruns. It will be evident that the construction is such that the friction member will lag in either direction into operative engagement with the driving cams upon the driving shaft. As applied to an automobile, for example, it will be evident that the driving shaft might be provided with mechanism of this description on both ends arranged to drive the rear wheels in either direction in any suitable manner, the above described mechanism becoming a substitute for the conventional differential gear, by allowing the outer wheel in turning corners, to overrun the driving shaft, thus compensating for the necessary difference of velocity in the inner and outer driving wheels.

It is evident that the cams $d$, $d$ and $f$, $f$ correspond and coöperate, while the cams $h$ and $i$ correspond and coöperate for the purposes described.

My invention contemplates, as will be seen, a construction wherein the driven member and the friction member are each provided with a single frictional surface for driving the driven member in both directions.

What I claim as my invention is:

1. A double acting friction ratchet mechanism comprising a driving shaft, a driven member, and a friction member to actuate the driven member, said driving shaft and friction member provided with coöperating driving cams and releasing cams at opposite extremities of the friction member whereby the driven member may overrun in the direction in which it is being driven, substantially as and for the purpose described.

2. A double acting friction ratchet mechanism comprising a driving shaft provided with driving cams and with releasing cams, a driven member, and a friction member to actuate the driven member, said friction member provided with cams to contact with the driving cams and with cams to contact with the releasing cams of the driving shaft the cams of the friction member being located at opposite extremities thereof, whereby the driven member may overrun in the direction in which it is being driven, substantially as and for the purpose described.

3. A double acting friction ratchet mechanism comprising driving mechanism to drive in both directions, a driven member, and a friction member to actuate the driven member, said driving shaft and friction member provided with coöperating driving cams and releasing cams at opposite extremities thereof, whereby the driven member may overrun in the direction in which it is being driven, substantially as and for the purpose described.

4. A double acting friction ratchet mechanism comprising a driving shaft, a driven member provided with a frictional surface, and a friction member to contact with the frictional surface of the driven member, said driving shaft and friction member provided with coöperating driving and releasing cams at opposite extremities thereof, whereby the driven member may overrun in the direction in which it is being driven, substantially as and for the purpose described.

5. A double acting friction ratchet mechanism comprising a driving shaft, a driven member provided with a frictional surface, and a frictional member to contact with the frictional surface of the driven member, said driving shaft and friction member provided with coöperating driving cams whereby the friction member may be advanced to engage the driven member when the driving shaft is rotated in either direction, said driving shaft and friction member provided with releasing cams to release the friction member from the driven member when the direction of rotation of the driving member is reversed, and whereby the driven member may overrun in the direction in which it is being driven, the driving cams and releasing cams of the frictional member being located at opposite extremities of the friction member, substantially as and for the purpose described.

6. A driving mechanism comprising a driving shaft, a friction member to be driven in either direction by the driving shaft, and a driven member actuated by the friction member, the driving shaft and the friction member provided with means at one extremity of the friction member to release the friction member when the direction of rotation of the driving shaft is reversed.

7. A double acting friction ratchet mechanism comprising a driving shaft, a friction member actuated by the driving shaft, a driven member actuated by the friction member, said friction and driven members being each provided with a single engaging frictional surface for driving the driven member in opposite directions, said driving shaft and friction member provided with means at one extremity of the friction member to release the friction member from the driven member when the direction of rotation of the driving member is reversed.

8. A double action friction ratchet mechanism comprising a driven member, a friction member to actuate the driven member, a driving shaft carried by the friction member, said driving shaft and friction member provided with coöperating driving cams and releasing cams whereby the driven member may overrun in the direction in which it is being driven.

9. A double acting friction ratchet mechanism comprising a driven member, a friction member to actuate the driven member, a driving shaft carried by the friction member, said driving shaft and friction member provided with coöperating driving cams and releasing cams whereby the driven member may overrun in the direction in which it is being driven, and an outer bearing for the driving cams and the friction member located upon the friction member.

In testimony whereof, I have signed this specification in the presence of two subscribing witnesses.

ALANSON P. BRUSH.

Witnesses:
WM. EMERY BRUSH,
E. M. SPIELBURG.